US010479653B2

(12) United States Patent
Li et al.

(10) Patent No.: US 10,479,653 B2
(45) Date of Patent: Nov. 19, 2019

(54) MONITORING SYSTEM OF A PASSENGER CONVEYOR, A PASSENGER CONVEYOR, AND A MONITORING METHOD THEREOF (71) Applicant: Otis Elevator Company, Farmington, CT (US)

(72) Inventors: Qiang Li, Shanghai (CN); Jianwei Zhao, Shanghai (CN); ZhaoXia Hu, Hangzhou (CN); LongWen Wang, Shanghai (CN); Hui Fang, Shanghai (CN); Zhen Jia, Shanghai (CN); Anna Su, Shanghai (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 15/663,456

(22) Filed: Jul. 28, 2017

(65) Prior Publication Data
US 2018/0029835 A1 Feb. 1, 2018

(30) Foreign Application Priority Data
Jul. 29, 2016 (CN) .......................... 2016 1 0610018

(51) Int. Cl.
*B66B 25/00* (2006.01)
*B66B 21/02* (2006.01)
(Continued)

(52) U.S. Cl.
CPC ............ *B66B 25/006* (2013.01); *B66B 21/02* (2013.01); *B66B 25/003* (2013.01); *B66B 29/005* (2013.01); *H05B 37/0227* (2013.01)

(58) Field of Classification Search
None
See application file for complete search history.

(56) References Cited

U.S. PATENT DOCUMENTS 5,258,586 A * 11/1993 Suzuki .................. B66B 1/2458
187/380
6,267,219 B1 7/2001 Spannhake et al.
(Continued)

FOREIGN PATENT DOCUMENTS

CN 103848329 A 6/2014
EP 1419988 A1 5/2004
(Continued)

OTHER PUBLICATIONS

Extended European Search Report for Application No. 17184136.4-1731 dated Jan. 3, 2018 (22 pp.).

*Primary Examiner* — William R Harp
(74) *Attorney, Agent, or Firm* — Cantor Colburn LLP (57) ABSTRACT A monitoring system includes: an imaging sensor configured to sense a lighting device of the passenger conveyor to acquire image data; and a processing apparatus configured to process the image data, the processing apparatus being configured to include: a background acquisition module configured to acquire a background model based on sensed image data; a foreground detection module configured to compare image data sensed in real time with the background model to obtain a foreground object; and a working condition judgment module configured to perform data processing at least based on the foreground object to judge whether the lighting device is in a normal state. Then, a failure or an abnormal lighting state of the lighting device can be timely diagnosed so that maintenance is performed.

29 Claims, 5 Drawing Sheets (51) Int. Cl.
*B66B 29/00* (2006.01)
*H05B 37/02* (2006.01)

(56) References Cited

U.S. PATENT DOCUMENTS

| | | | |
|---|---|---|---|
| 6,606,538 B2* | 8/2003 | Ponsot | B66B 25/00 198/322 |
| 8,028,807 B2 | 10/2011 | Deplazes et al. | |
| 8,264,538 B2* | 9/2012 | Horbruegger | B66B 29/06 348/143 |
| 8,619,135 B2* | 12/2013 | Shellshear | H04N 7/18 348/135 |
| 9,896,309 B2* | 2/2018 | Wang | B66B 25/00 |
| 2003/0168288 A1 | 9/2003 | Deplazes et al. | |
| 2004/0094366 A1 | 5/2004 | Weinberger et al. | |
| 2005/0088520 A1* | 4/2005 | Wiesinger | B66B 27/00 348/143 |
| 2005/0207655 A1* | 9/2005 | Chopra | G06T 7/0004 382/218 |
| 2009/0222223 A1 | 9/2009 | Walters et al. | |
| 2011/0025847 A1 | 2/2011 | Park et al. | |
| 2013/0075201 A1* | 3/2013 | Lee | B66B 13/26 187/316 |
| 2013/0163233 A1 | 6/2013 | Niedermayer et al. | |
| 2013/0279201 A1 | 10/2013 | Matheisl et al. | |

FOREIGN PATENT DOCUMENTS

| | | |
|---|---|---|
| EP | 1715455 A1 | 10/2006 |
| GB | 388817 A | 3/1933 |
| GB | 2312057 A | 10/1997 |
| JP | 1-296590 A | 11/1989 |
| JP | H10139349 A | 5/1998 |
| JP | 2000159470 A | 6/2000 |
| JP | 2004315186 A | 11/2004 |
| JP | 2007-276941 A | 10/2007 |
| JP | 2013-71795 A | 4/2013 |
| WO | 2013/092241 A1 | 6/2013 |
| WO | 2015171774 A1 | 11/2015 |

* cited by examiner

MONITORING SYSTEM OF A PASSENGER CONVEYOR, A PASSENGER CONVEYOR, AND A MONITORING METHOD THEREOF

FOREIGN PRIORITY

This application claims priority to Chinese Patent Application No. 201610610018.2, filed Jul. 29, 2016, and all the benefits accruing therefrom under 35 U.S.C. § 119, the contents of which in its entirety are herein incorporated by reference.

TECHNICAL FIELD

The present invention relates to the field of passenger conveyors, and in particular, to a monitoring system of a lighting device of a passenger conveyor and a monitoring method thereof.

BACKGROUND ART

As a tool for helping a passenger to walk between floors or reducing a walking distance of the passenger, a passenger conveyor is very common in daily life. For example, an escalator usually used between floors of a commercial building and a moving walk usually used in a large airport are especially common.

For such a tool, a lighting device may usually be arranged at multiple positions of the passenger conveyor in order to make it easy for a passenger to take the conveyor or provide an indication or for the purpose of beauty. For example, a traffic flow lamp is arranged at an entry of the passenger conveyor; a comb lamp or a step lamp is arranged at steps of the passenger conveyor; a handrail lamp is arranged on a moving handrail of the passenger conveyor; and barrier lamps are arranged on barriers on two sides of the passenger conveyor. When a corresponding lighting device no longer works due to a failure, it may lead to a corresponding lack of the technical effect brought by the lighting device. Besides, in consideration of different requirements on a light intensity due to changes in an application environment and changes in the environment with time, if the light intensity of the corresponding lighting device could be adjusted correspondingly to adapt to the environment, a further energy-saving effect may be provided.

SUMMARY OF THE INVENTION

An objective of the present invention is to provide a monitoring system of a passenger conveyor.

Another objective of the present invention is to provide a moving handrail monitoring method of a passenger conveyor.

A further objective of the present invention is to provide a passenger conveyor.

According to one aspect of the present invention, a monitoring system of a passenger conveyor is provided, including: an imaging sensor configured to sense a lighting device of the passenger conveyor to acquire image data; and a processing apparatus configured to process the image data to monitor whether the lighting device is in a normal state, the processing apparatus being configured to include: a background acquisition module configured to acquire a background model based on image data sensed when the lighting device is in a normal state or in an abnormal state; a foreground detection module configured to compare image data sensed in real time with the background model to obtain a foreground object; and a working condition judgment module configured to perform data processing at least based on the foreground object to judge whether the lighting device is in a normal state.

According to another aspect of the present invention, a monitoring method for a passenger conveyor is further provided, including: S100, an image acquisition step: sensing a lighting device of the passenger conveyor to acquire image data; S200, a background acquisition step: acquiring a background model based on image data sensed when the lighting device is in a normal state or in an abnormal state; S300, a foreground detection step: comparing image data sensed in real time with the background model to obtain a foreground object; and S400, a working condition judgment step: performing data processing at least based on the foreground object to judge whether the lighting device is in a normal state.

According to one aspect of the present invention, a passenger conveyor is further provided, including the monitoring system as described above.

DETAILED DESCRIPTION

The present invention is now described more completely with reference to the accompanying drawings. Exemplary embodiments of the present invention are illustrated in the accompanying drawings. However, the present invention may be implemented in lots of different forms, and should not be understood as being limited to the embodiments described herein. On the contrary, the embodiments are provided to make the disclosure thorough and complete, and fully convey the concept of the present invention to those skilled in the art. In the accompanying drawings, like reference numerals refer to like elements or components, and thus the descriptions thereof are omitted.

Some block diagrams shown in the accompanying drawings are functional entities, and do not necessarily correspond to physically or logically independent entities. The functional entities may be implemented in the form of software, or the functional entities are implemented in one or more hardware modules or an integrated circuit, or the functional entities are implemented in different processing apparatuses and/or microcontroller apparatuses.

In the present invention, the passenger conveyor includes an Escalator and a Moving walk. In the following illustrated embodiments, the monitoring system and the monitoring method according to the embodiments of the present invention are described in detail by taking the escalator as an example. However, it would be appreciated that the monitoring system and the monitoring method for an escalator in the following embodiments may also be analogically applied to a moving walk. Adaptive improvements or the like that may need to be performed can be obtained by those skilled in the art with the teachings of the embodiments of the present invention.

Figure 1:
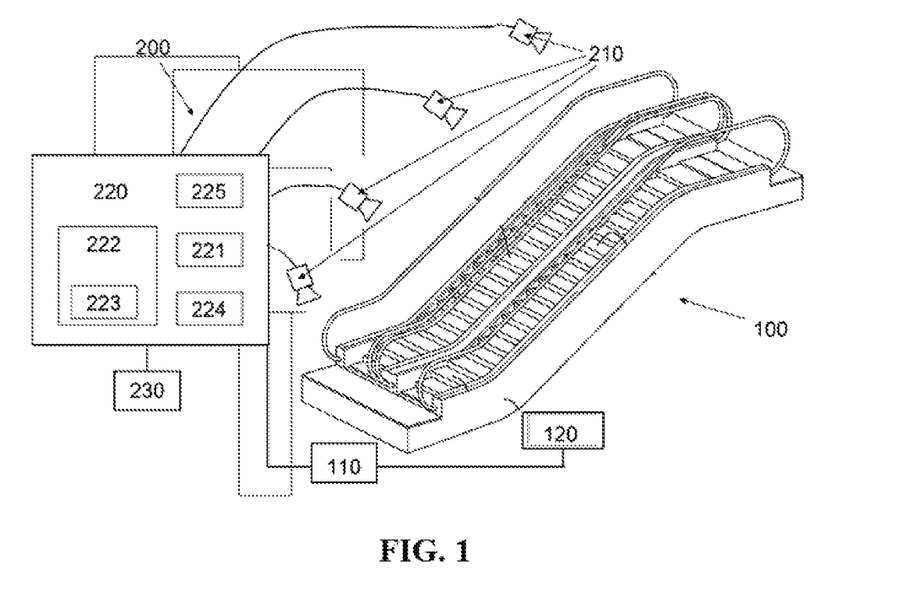
FIG. 1 is a schematic diagram of an embodiment of a passenger conveyor and a monitoring system thereof according to the present invention.

Referring to FIG. 1, a passenger conveyor 100 and a monitoring system of a lighting device thereof are shown. The passenger conveyor 100 in FIG. 1 includes an escalator, a controller 110 thereof and a driving part 120. The controller 110 may be associated with the monitoring system, and control each part of the passenger conveyor 100 based on instructions or parameter information fed back by the monitoring system. Under some special circumstances, the controller 110 may even shut down the passenger conveyor 100 temporarily directly through the driving part 120.

The lighting device monitoring system 200 includes: an imaging sensor 210 and a processing apparatus 220. The processing apparatus 220 includes: a background acquisition module 221, a foreground detection module 222 and a working condition judgment module 224, thus being able to monitor the lighting condition of the lighting device of the passenger conveyor 100, to provide necessary alarm or maintenance, and further to avoid danger caused by improper lighting indication or a decrease in user experience due to an improper lighting intensity.

Specifically, the imaging sensor 210 described in the foregoing embodiment is mainly configured to sense the lighting device of the passenger conveyor 100 to acquire image data, and in the subsequent processing, extract required features in the image data to make a corresponding judgment. For example, the features may be luminous color and a light intensity of the lighting device, a position of the lighting device, and so on.

As an illustrative example, the imaging sensor 210 may be a 2D image sensor of various types. It should be understood that any image sensor capable of capturing an image frame including pixel grayscale information may be applied here. Definitely, image sensors capable of capturing an image frame including pixel grayscale information and color information (such as RGB information) may also be applied here.

The depth sensing sensors may be specific to any 1D, 2D or 3D depth sensor or a combination thereof. Such a sensor is operable in an optical, electromagnetic or acoustic spectrum capable of producing a depth map (also known as a point cloud or occupancy grid) with a corresponding size. Various depth sensing sensor technologies and devices include, but are not limited to, structural light measurement, phase shift measurement, time-of-flight measurement, a stereo triangulation device, an optical triangulation measurement plate, a light field camera, a coded aperture camera, a computational imaging technology, simultaneous localization and mapping (SLAM), imaging radar, imaging sonar, a scanning LIDAR, a flash LIDAR, a passive infrared (PIR) sensor and a small focal plane array (FPA) or a combination including at least one of the foregoing. Different technologies may include active (transmitting and receiving a signal) or passive (only receiving a signal) and may operate in a band of electromagnetic or acoustic spectrum (such as visual and infrared). The use of depth sensing may have specific advantages over conventional 2D imaging. The use of infrared sensing may have specific benefits over visible spectrum imaging such that alternatively, or additionally, the sensor may be an infrared sensor with one or more pixels of spatial resolution, e.g., a Passive Infrared (PIR) sensor or a small IR Focal Plane Array (FPA).

It should be noted that there may be qualitative and quantitative differences between the 2D imaging sensor 210 (e.g., conventional security cameras) and 1D, 2D, or 3D depth sensing sensors to the extent that the depth-sensing provides numerous advantages. In 2D imaging, reflected color (a mixture of wavelengths) from a first object in each radial direction from an imager is captured. A 2D image, then, may include a combined spectrum of a source illumination and a spectral reflectivity of objects in a scene. The 2D image may be interpreted by a person as a picture. In 1D, 2D, or 3D depth-sensing sensors, there is no color (spectral) information; rather, a distance (depth, range) to a first reflective object in a radial direction (1D) or directions (2D, 3D) from the sensor is captured. 1D, 2D, and 3D technologies may have inherent maximum detectable range limits and may be of relatively lower spatial resolution than typical 2D imagers. In terms of relative immunity to ambient lighting problems, compared to conventional 2D imaging, the use of 1D, 2D, or 3D depth sensing may advantageously provide improved operations, and better separation and better privacy protection of shielded objects. The use of infrared sensing may have specific benefits over visible spectrum imaging. For example, a 2D image may not be able to be converted into a depth map nor may a depth map have the ability to be converted into a 2D image (for example, an artificial assignment of contiguous color or grayscale to contiguous depths may allow a person to crudely interpret a depth map somewhat akin to how a person sees a 2D image, and it is not an image in the conventional sense).

Besides, the processing apparatus 220 is mainly configured to process the image data to monitor whether the lighting device is in a normal state, and modules that the processing apparatus 220 should be provided with will be described as follows: a background acquisition module 221 configured to acquire a background model based on image data sensed when the lighting device is in a normal state or in an abnormal state; a foreground detection module 222 configured to compare image data sensed in real time with the background model to obtain a foreground object; and a working condition judgment module 224 configured to perform data processing at least based on the foreground object to judge whether the lighting device is in a normal state. By using the provided background model as a basis of reference, an image sensed in real time is compared with the background model to acquire a required foreground object, and a judgment result is further acquired based on data processing on the foreground object. Thus, the lighting device is maintained to stay in a normal state.

The lighting device monitoring system 200 for the passenger conveyor 100 according to this embodiment is capable of finding, at an early time, the problem existing in the lighting device that the lighting device does not work or the lighting intensity thereof is abnormal, and recovering the lighting device from various abnormal states to a normal state as soon as possible, thus helping avoid safety accidents caused by wrong lighting indications and avoid a decrease in user experience caused by abnormity of the lighting intensity.

The foregoing embodiments further have several improvements or modifications, and some of these modifications are selected and described in the following.

For example, when there is no object interfering with monitoring, such as a passenger, in the foreground image data sensed in real time, suppose that the processing result after comparison between the image data sensed in real time and the background model is 0, it indicates that the lighting device is in a normal state. If there is an interference factor in the foreground image data sensed in real time, a foreground object is obtained after the image data is compared with the background model. Further, the processing apparatus 220 is further provided with: a foreground feature extraction module 223 configured to extract a corresponding lighting state foreground feature from the foreground object according to the lighting device, and the working condition judgment module 224 further judges whether the lighting device is in a normal state based on the lighting state foreground feature.

As an example, the lighting state foreground feature extracted by the foreground feature extraction module 223 includes color of the lighting device and/or a light intensity of the lighting device and/or a light intensity of a monitored area, and the working condition judgment module 224 judges, based on the color of the lighting device and/or the light intensity of the lighting device and/or the light intensity of the monitored area, whether the lighting device is normal. When the lighting device is abnormal, the color and/or the light intensity thereof may change correspondingly. Therefore, correspondingly, by analyzing the change in the color and/or the light intensity thereof, whether the lighting device is normal can also be accurately and effectively embodied. In addition, as the light intensity of the monitored area may also influence whether it is necessary to turn on the lighting device or whether the lighting intensity is excessive, whether the lighting device is normal may also be embodied indirectly.

To make it easy to understand the relation of the abnormal state of the lighting device and the color and/or the light intensity, several examples are provided in the following for reference.

As a first example, when the processing apparatus 220 detects whether the lighting device emits light, the working condition judgment module 224 may judge, based on the color and/or the light intensity of the lighting device, whether the lighting device is normal. This is because if color of lighting or a non-zero light intensity exists, it may be judged that the lighting device is in a lighting state. On the contrary, if no color of lighting exists or the light intensity is 0, it may be judged that the lighting device is in a non-lighting state. If a judgment is made based on a combination of color of lighting and a light intensity, the result may be more accurate correspondingly, and it is conducive to avoiding an incorrect judgment.

As a second example, when the processing apparatus 220 detects whether the lighting brightness of the lighting device is suitable, the working condition judgment module 224 judges, based on the light intensity of the lighting device, whether the lighting device is normal. This is because whether the lighting brightness of the lighting device is suitable can be judged according to the comparison between the light intensity sensed in real time and an ambient light intensity.

As a third example, when the processing apparatus 220 detects whether the lighting brightness of the lighting device is suitable, the working condition judgment module 224 judges, based on the light intensity and the color of the lighting device, whether the lighting device is normal. This is because whether the lighting brightness of the lighting device is suitable can be judged according to the comparison between the light intensity sensed in real time and an ambient light intensity. The addition of the color can improve the accuracy of the judgment, being conducive to avoiding an incorrect judgment.

As a fourth example, when the processing apparatus 220 detects whether the lighting brightness of the lighting device is suitable, the working condition judgment module 224 judges, based on the light intensity and the color of the monitored area, whether the lighting device is normal. This is because whether the lighting brightness of the lighting device corresponding to the monitored area is suitable can be judged according to the comparison between the light intensity of the monitored area and a normal situation.

Alternatively, multiple groups of different lighting devices may be arranged at different positions on a conventional passenger conveyor 100. At this point, the lighting state foreground feature extracted by the foreground feature extraction module 223 further includes positions of the lighting devices, to identify, based on different positions, a lighting device to be monitored, and to conduct data analysis for judging whether the corresponding lighting state is abnormal. At this point, the working condition judgment module 224 may judge, based on one or more of the color, the light intensity and the position of the lighting device and/or the light intensity of the monitored area, whether the lighting device is normal.

To make it easy to understand the relation of the abnormal state of the lighting device to one or more of the color, the light intensity and the position, several examples are provided in the following for reference.

As a first example, when the processing apparatus 220 detects whether the lighting device emits light, the working condition judgment module 224 may judge, based on the position, the color and/or the light intensity of the lighting device, whether the lighting device is normal. This is because after the lighting device on which data analysis needs to be performed is identified through position data, if the lighting device has color of lighting or a non-zero light intensity, it may be judged that the lighting device is in a lighting state. On the contrary, if no color of lighting exists or the light intensity is 0, it may be judged that the lighting device is in a non-lighting state. If a judgment is made based on a combination of color of lighting and a light intensity, the result may be more accurate correspondingly, and it is conducive to avoiding an incorrect judgment.

As a second example, when the processing apparatus 220 detects whether the lighting brightness of the lighting device is suitable, the working condition judgment module 224 may judge, based on the light intensity and the position of the lighting device, whether the lighting device is normal. This is because after the lighting device on which data analysis needs to be performed is identified through the position data, whether the lighting brightness of the lighting device is suitable can be judged according to the comparison between the light intensity sensed in real time and an ambient light intensity.

As a third example, when the processing apparatus 220 detects whether the lighting brightness of the lighting device is suitable, the working condition judgment module 224 may judge, based on the light intensity, the color and the position of the lighting device, whether the lighting device is normal. This is because after the lighting device on which data analysis needs to be performed is identified through the position data, whether the lighting brightness of the lighting device is suitable can be judged according to the comparison between the light intensity sensed in real time and an ambient light intensity. The addition of the color may improve the accuracy of the judgment, being conducive to avoiding an incorrect judgment.

As a fourth example, when the processing apparatus 220 detects whether the lighting brightness of the lighting device is suitable, the working condition judgment module 224 may judge, based on the position of the lighting device and the light intensity of the monitored area, whether the lighting device is normal. This is because after the lighting device on which data analysis needs to be performed is identified through the position data, whether the lighting brightness of the lighting device is suitable can be judged according to the comparison between an ambient light intensity sensed in real time and a normal situation.

In order to enhance and improve various effects of the foregoing embodiments from various aspects, several improvements and modifications based on the foregoing embodiments are further provided herein.

For example, the working condition judgment module 224 is further configured to judge, based on the lighting state foreground feature of the foreground object, whether a specific lighting device is normal, if the judgment result is "yes", give up the judgment, based on the image data processed currently, on whether the lighting device is in a normal state or give up the judgment result of whether the lighting device corresponding to the image data processed currently is in a normal state.

For another example, the working condition judgment module 224 is further configured to determine, when a judgment result of at least two successive pieces of image data is that the lighting device is in a same abnormal state, that the lighting device is in the abnormal state. Through multiple times of monitoring, the lighting device is judged to be in an abnormal state after identical judgment results are acquired. This improves the accuracy of the judgment, and reduces the misjudgment rate.

For another example, the imaging sensor 210 senses at intervals of a predetermined time period to acquire image data of the lighting device in the predetermined time period, and provides the image data for the processing apparatus 220 for data processing. Through discontinuous judgments, the same monitoring effect may also be achieved to some extent. For example, in the evening, because fewer users use the passenger conveyor 100, at this point, the use of less frequent monitoring may reduce the monitoring cost, and also basically achieve a similar detection and safety protection effect.

Further, the background acquisition module 221 is configured to acquire a first background model based on image data sensed when the lighting device is in a lighting state, or acquire a second background model based on image data sensed when the lighting device is in a non-lighting state, or acquire a third background model group based on image data sensed when the lighting device is in a lighting state with multiple specific light intensities. The selection of a background model is mainly to provide a relative reference during judgment. For example, when a first background model is acquired based on image data sensed when the lighting device is in a lighting state, if a detected foreground object is different from the first background model, it indicates that the lighting device is not in a lighting state, and the lighting device may be considered to be abnormal. For another example, when a second background model is acquired based on image data sensed when the lighting device is in a non-lighting state, if a detected foreground object is different from the second background model, it indicates that the lighting device may be in a lighting state, and the lighting device may be considered to be normal. For another example, when a third background model group is acquired based on image data sensed when the lighting device is in a lighting state with multiple specific light intensities, it is mainly considered that different light intensities need to be applied to the lighting device under different circumstances. At this point, N third background models may be set based on the real condition, and jointly make up a third background model group. In the judgment process, which third background model in the third background model group is used will be judged specifically based on an actual situation, and when the detected foreground object is different from the third background model, it indicates that the lighting device may be under a non-set lighting intensity, and the lighting device may be considered to be abnormal.

In addition, as the imaging sensor 210 has a more accurate sensing result within a particular range, in order to improve the accuracy of the detection, multiple imaging sensors 210 may be arranged along a length direction of the passenger conveyor 100.

Further, the monitoring system further includes an alarm unit 230, and the working condition judgment module 224 triggers the alarm unit 230 to work when determining that the lighting device is abnormal. Correspondingly, the processing apparatus 220 is further configured to trigger, when the working condition judgment module 224 determines that the lighting device is in an abnormal state, outputting of a signal to the passenger conveyor 100 and/or an elevator maintenance center of a building. Then, the maintenance center or maintenance personnel will take a corresponding disposal measure according to the monitoring result, thus preventing occurrence of a safety accident.

Further, the monitoring system further includes a learning module 225. The learning module 225 is configured to monitor a lighting state foreground feature of the lighting device of the passenger conveyor 100 under a daily operation condition, to update the background model acquired by the background acquisition module 221. In different places, there are different situations and different requirements for whether the lighting device is turned on or off normally and whether the lighting intensity of the lighting device is normal. Such an arrangement may cause the monitoring system to be able to quickly learn and set a background model according to an actual requirement, thus making the monitoring system better and faster adapt to application places.

In addition, although in the foregoing embodiments, image data is collected by the imaging sensor 210, those skilled in the art should know that other sensors capable of collecting image data may also be applied here. For example, as an example, an RGB-D sensor may also be used as a sensor herein. Specifically, the RGB-D sensor is a sensor integrating the imaging sensor 210 and a depth sensing sensor together, which can not only provide image data but also, under some special circumstances, additionally provide depth image data to assist in monitoring the lighting device.

In addition, there are usually various types of lighting devices in the passenger conveyor 100, which may be one or any combination of a traffic flow lamp, a comb lamp, a step lamp, a handrail lamp, and a barrier lamp.

Figure 2:
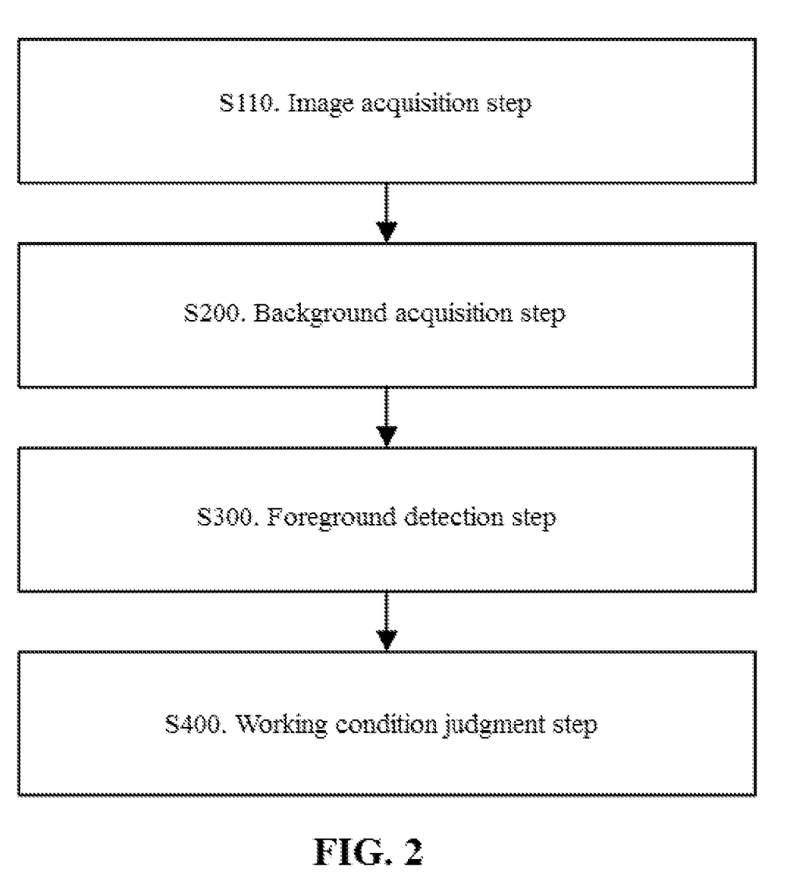
FIG. 2 is a schematic diagram of steps in an embodiment of a moving handrail monitoring method of a passenger conveyor according to the present invention.
Figure 3:
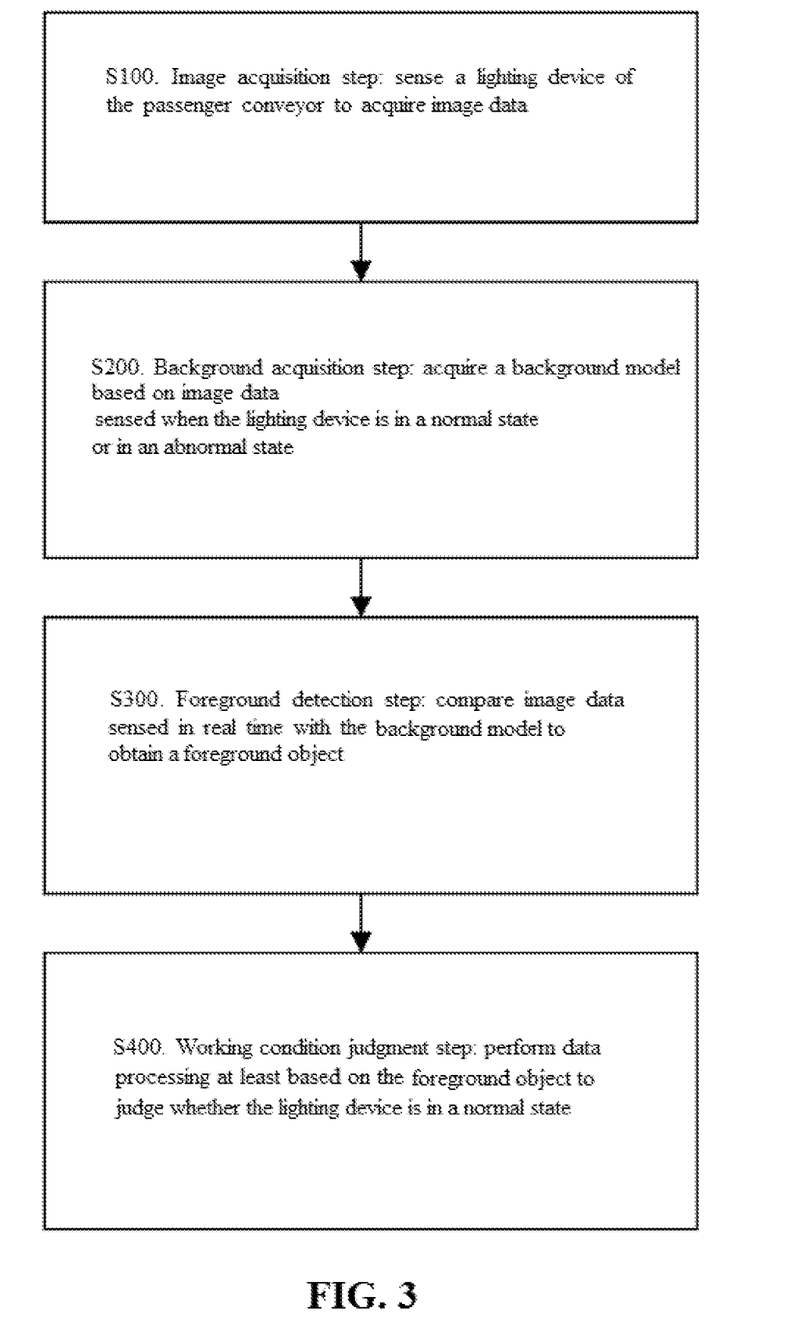
FIG. 3 is a control flow chart of an embodiment of a moving handrail monitoring method of a passenger conveyor according to the present invention.

Besides, a monitoring method of the lighting device of the passenger conveyor 100 is further provided herein, to be used in cooperation with the monitoring system of the lighting device described in the foregoing embodiment. Refer to FIG. 2 and FIG. 3. The monitoring method includes the following steps: S100, an image acquisition step: sensing a lighting device of the passenger conveyor 100 to acquire image data; S200, a background acquisition step: acquiring a background model based on image data sensed when the lighting device is in a normal state or in an abnormal state; S300, a foreground detection step: comparing image data sensed in real time with the background model to obtain a foreground object; and S400, a working condition judgment step: performing data processing at least based on the foreground object to judge whether the lighting device is in a normal state. This method can accurately and timely identify the problem existing in the lighting device that lighting is unrealized due to a failure, there is a deviation between a lighting intensity and an expected lighting intensity, and so on, and make an alarm so that the monitoring center or monitoring personnel can make a response timely.

Figure 4:
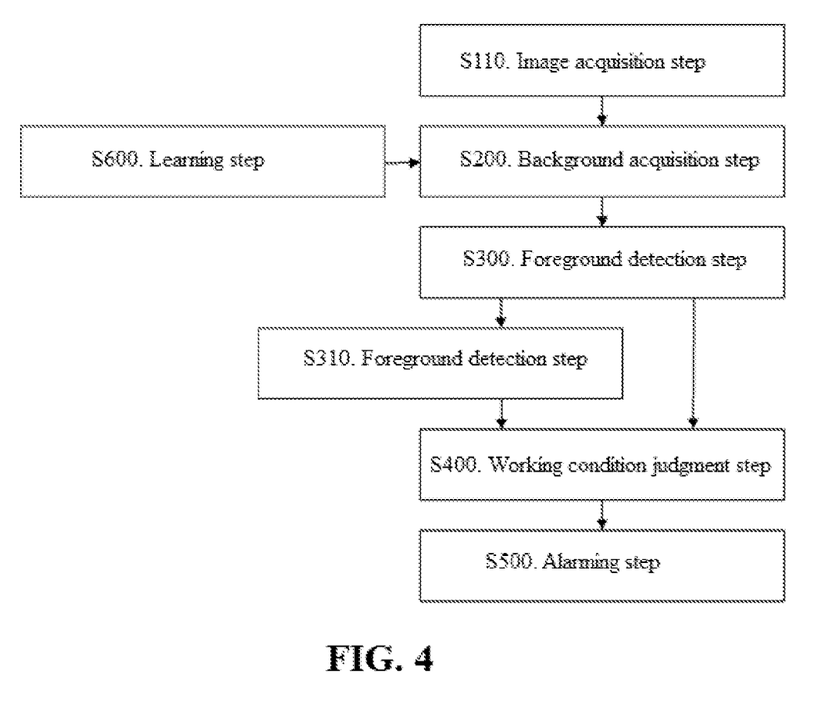
FIG. 4 is a schematic diagram of steps in another embodiment of a moving handrail monitoring method of a passenger conveyor according to the present invention.
Figure 5:
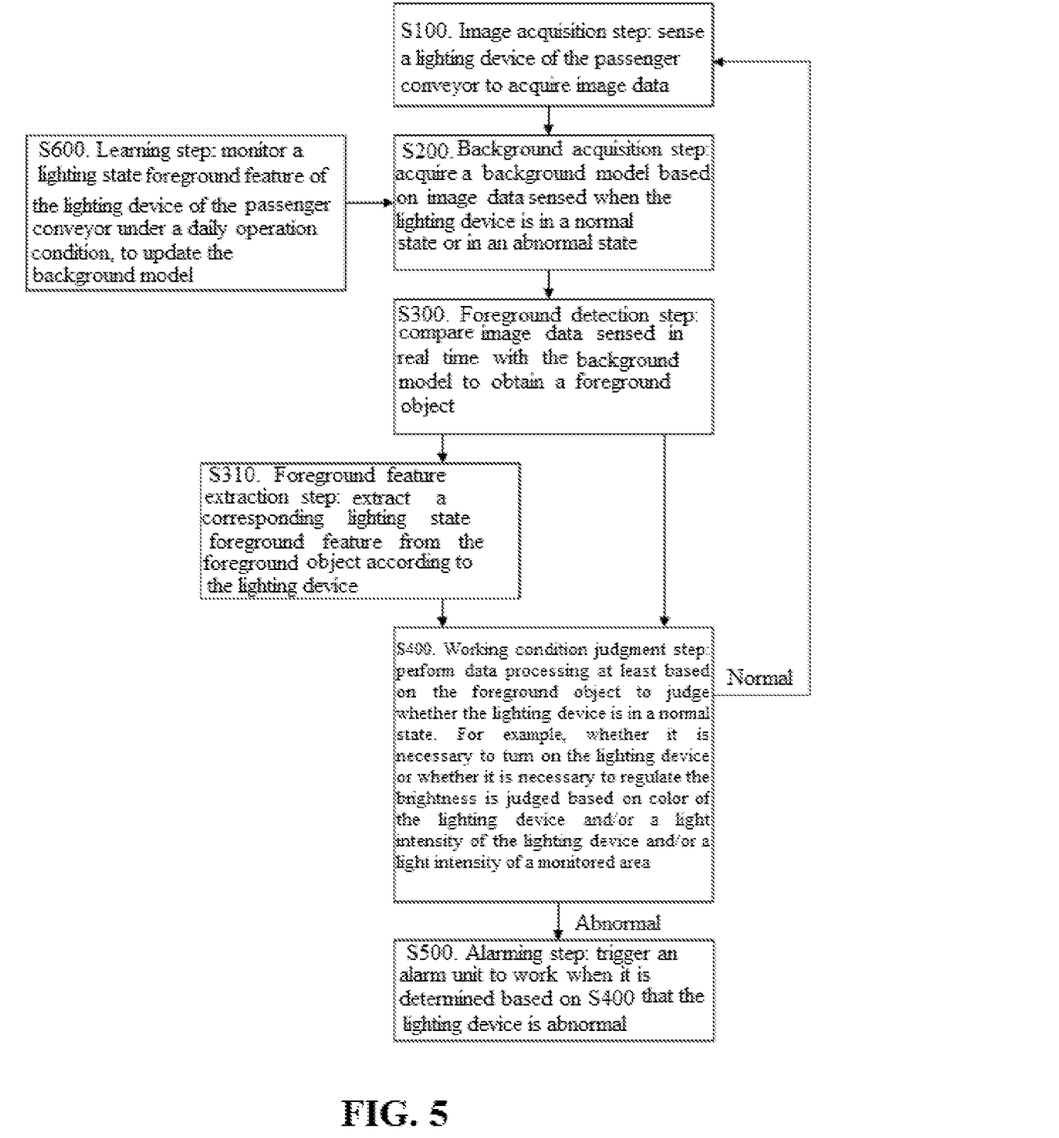
FIG. 5 is a control flow chart of another embodiment of a moving handrail monitoring method of a passenger conveyor according to the present invention.

In addition, in order to improve the practicability or accuracy of the monitoring method in the foregoing embodiments, several improvements or modifications to various steps are further provided with reference to FIG. 4 and FIG. 5.

Specifically, when there is no object interfering with monitoring, such as a passenger, in the foreground image data sensed in real time, suppose that the processing result after comparison between the image data sensed in real time and the background model is 0, it indicates that the lighting device is in a normal state. If there is an interference factor in the foreground image data sensed in real time, a foreground object is obtained after the image data is compared with the background model. Therefore, at this point, the monitoring method further includes: S310, a foreground feature extraction step: extracting a corresponding lighting state foreground feature from the foreground object according to the lighting device; wherein, in S400 of the monitoring method, whether the lighting device is in a normal state is judged based on the lighting state foreground feature.

As an example, in S310 of the monitoring method, the extracted lighting state foreground feature includes color of the lighting device and/or a light intensity of the lighting device and/or a light intensity of a monitored area; in S400 of the monitoring method, whether the lighting device is normal is judged based on the color of the lighting device and/or the light intensity of the lighting device and/or the light intensity of the monitored area. When the lighting device is abnormal, the color and/or the light intensity thereof may change correspondingly. Therefore, correspondingly, by analyzing the change in the color and/or the light intensity thereof, whether the lighting device is normal can be accurately and effectively embodied. In addition, as the light intensity of the monitored area may also influence whether it is necessary to turn on the lighting device or whether the lighting intensity is excessive, whether the lighting device is normal may also be embodied indirectly.

To make it easy to understand the relation of the abnormal state of the lighting device to the color and/or the light intensity, several detection examples are listed in the following for reference.

As a first example, in S400 of the monitoring method, when judging whether the lighting device is in a normal state is judging whether the lighting device emits light, whether the lighting device is normal is judged based on the color and/or the light intensity of the lighting device. This is because if color of lighting or a non-zero light intensity exists, it may be judged that the lighting device is in a lighting state. On the contrary, if no color of lighting exists or the light intensity is 0, it may be judged that the lighting device is in a non-lighting state. If a judgment is made based on a combination the color of lighting and the light intensity, the result may be more accurate correspondingly, and it is conducive to avoiding an incorrect judgment.

As a second example, in S400 of the monitoring method, when judging whether the lighting device is in a normal state is judging whether the lighting brightness of the lighting device is suitable, whether the lighting device is normal is judged based on the light intensity of the lighting device. This is because whether the lighting brightness of the lighting device is suitable can be judged according to the comparison between the light intensity sensed in real time and an ambient light intensity.

As a third example, in S400 of the monitoring method, when judging whether the lighting device is in a normal state is judging whether the lighting brightness of the lighting device is suitable, whether the lighting device is normal is judged based on the light intensity and the color of the lighting device. This is because whether the lighting brightness of the lighting device is suitable can be judged according to the comparison between the light intensity sensed in real time and an ambient light intensity. The addition of the color may improve the accuracy of the judgment, being conducive to avoiding an incorrect judgment.

As a fourth example, in S400 of the monitoring method, when judging whether the lighting device is in a normal state is judging whether the lighting brightness of the lighting device is suitable, whether the lighting device is normal is judged based on the light intensity and the color of the monitored area. This is because whether the lighting brightness of the lighting device corresponding to the monitored area is suitable can be judged according to the comparison between the light intensity of the monitored area and a normal situation.

Alternatively, multiple groups of various lighting devices may be arranged at different positions on a conventional passenger conveyor 100. At this point, in S310 of the monitoring method, the extracted lighting state foreground feature further includes positions of the lighting devices, to identify, based on different positions, a lighting device to be monitored and conduct data analysis for judging whether the corresponding lighting state is abnormal. Therefore, correspondingly, in S400 of the monitoring method, whether the lighting device is in a normal state should also be judged based on one or more of the color, the light intensity and the position of the lighting device and/or the light intensity of the monitored area.

To make it easy to understand that the relation of the abnormal state of the lighting device to one or more of the color, the light intensity and the position, several detection examples are listed in the following for reference.

As a first example, in S400 of the monitoring method, when judging whether the lighting device is in a normal state is judging whether the lighting device emits light, whether the lighting device is in a normal state is judged based on the position, the color and/or the light intensity of the lighting device. This is because after the lighting device on which data analysis needs to be performed is identified through position data, if the lighting device has color of lighting or a non-zero light intensity, it may be judged that the lighting device is in a lighting state. On the contrary, if no color of lighting exists or the light intensity is 0, it may be judged that the lighting device is in a non-lighting state. If a judgment is made based on a combination of color of lighting and the light intensity, the result may be more accurate correspondingly, and it is conducive to avoiding an incorrect judgment.

As a second example, in S400 of the monitoring method, when judging whether the lighting device is in a normal state is judging whether the lighting brightness of the lighting device is suitable, whether the lighting device is in a normal state is judged based on the light intensity and the position of the lighting device. This is because after the lighting device on which data analysis needs to be performed is identified through position data, whether the lighting brightness of the lighting device is suitable can be judged according to the comparison between the light intensity sensed in real time and an ambient light intensity.

As a third example, in S400 of the monitoring method, when judging whether the lighting device is in a normal state is judging whether the lighting brightness of the lighting device is suitable, whether the lighting device is in a normal state is judged based on the light intensity, the color and the position of the lighting device. This is because after the lighting device on which data analysis needs to be performed is identified through position data, whether the lighting brightness of the lighting device is suitable can be judged according to the comparison between the light intensity sensed in real time and an ambient light intensity. The addition of the color may improve the accuracy of the judgment, being conductive to avoiding an incorrect judgment.

As a fourth example, in S400 of the monitoring method, when judging whether the lighting device is in a normal state is judging whether the lighting brightness of the lighting device is suitable, whether the lighting device is in a normal state is judged based on the position of the lighting device and the light intensity of the monitored area. This is because after the lighting device on which data analysis needs to be performed is identified through position data, whether the lighting brightness of the lighting device is suitable can be judged according to the comparison between an ambient light intensity sensed in real time and a normal situation.

In order to enhance and improve various effects of the foregoing embodiments from various aspects, several improvements and modifications based on the foregoing embodiments are further provided herein.

For example, S400 of the monitoring method further includes judging, based on the lighting state foreground feature of the foreground object, whether a specific lighting device is normal, and if the judgment result is "yes", giving up the judgment, based on the image data processed currently, on whether the lighting device is in a normal state or give up the judgment result of whether the lighting device corresponding to the image data processed currently is in a normal state.

For another example, S400 of the monitoring method further includes determining, when a judgment result of at least two successive pieces of image data is that the lighting device is in a same abnormal state that the lighting device is in the abnormal state. Through multiple times of monitoring, the lighting device is judged to be in an abnormal state after identical judgment results are acquired. This improves the accuracy of the judgment, and reduces the misjudgment rate.

For another example, S100 of the monitoring method further includes sensing at intervals of a predetermined time period to acquire image data of the lighting device in the predetermined time period, and providing the image data for the processing apparatus 220 for data processing. Through discontinuous judgments, the same monitoring effect may also be achieved to some extent. For example, in the evening, because fewer users use the passenger conveyor 100, at this point, the use of less frequent monitoring may save the monitoring cost, and also basically achieve a similar detection and safety protection effect.

Further, S200 of the monitoring method further includes acquiring a first background model based on image data sensed when the lighting device is in a lighting state, or acquiring a second background model based on image data sensed when the lighting device is in a non-lighting state, or acquiring a third background model group based on image data sensed when the lighting device is in a lighting state with multiple specific light intensities. For example, when a first background model is acquired based on image data sensed when the lighting device is in a lighting state, if a detected foreground object is different from the first background model, it indicates that the lighting device is not in a lighting state, and the lighting device may be considered to be abnormal. For another example, when a second background model is acquired based on image data sensed when the lighting device is in a non-lighting state, if a detected foreground object is different from the second background model, it indicates that the lighting device may be in a lighting state, and the lighting device may be considered to be normal. For another example, when a third background model group is acquired based on image data sensed when the lighting device is in a lighting state with multiple specific light intensities, it is mainly considered that different light intensities need to be applied to the lighting device under different situations. At this point, N third background models may be set based on the real condition, and jointly make up a third background model group. In the judgment process, which third background model in the third background model group is used will be judged specifically based on an actual situation, and when the detected foreground object is different from the third background model, it indicates that the lighting device may be under a non-set lighting intensity, and the lighting device may be considered to be abnormal.

Further, the monitoring method further includes S500, an alarming step: triggering an alarm unit 230 to work when it is determined based on S400 that the lighting device is abnormal, so that the maintenance center or maintenance personnel makes a corresponding disposal measure according to the monitoring result, thus preventing occurrence of a safety accident.

Further, the monitoring method further comprises S600, a learning step: monitoring a lighting state foreground feature of the lighting device of the passenger conveyor 100 under a daily operation condition, to update the background model acquired in S200.

Further, under the concept of the present invention, an embodiment of a passenger conveyor 100 is further provided, which is applicable to the monitoring system mentioned in any of the foregoing embodiments, and therefore has the corresponding advantage. The passenger conveyor 100 is also applicable to the monitoring method mentioned in any of the foregoing embodiments, thus further improving the effect of the monitoring system.

It should be noted that the elements disclosed and depicted herein (including flow charts and block diagrams in the accompanying drawings) imply logical boundaries between the elements. However, according to software or hardware engineering practices, the depicted elements and the functions thereof may be implemented on machines through computer executable media. The computer executable media have a processor capable of executing program instructions stored thereon as a monolithic software structure, as standalone software modules, or as modules that employ external routines, code, services, and so forth, or any combination of these, and all such implementations may be within the scope of the present disclosure.

Although the different non-limiting implementation solutions have specific illustrated components, the implementation solutions of the present invention are not limited to those particular combinations. It is possible to use some of the components or features from any of the non-limiting implementation solutions in combination with features or components from any of the other non-limiting implementation solutions.

Although particular step sequences are shown, disclosed, and claimed, it should be appreciated that the steps may be performed in any order, separated or combined unless otherwise indicated and will still benefit from the present disclosure.

The foregoing description is exemplary rather than defined by the limitations within. Various non-limiting implementation solutions are disclosed herein, however, persons of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason, the appended claims should be studied to determine the true scope and content.

The invention claimed is:

1. A monitoring system of, comprising:
    an imaging sensor configured to sense a lighting device of the passenger conveyor to acquire image data;
    a microcontroller configured to process the image data to monitor whether the lighting device is in a normal state, the microcontroller having a plurality of modules, wherein the plurality of modules includes:
        a background acquisition module configured to acquire a background model based on the image data sensed when the lighting device is in a normal state or in an abnormal state;
        a foreground detection module configured to compare image data sensed in real time with the background model to obtain a foreground object; and
        a working condition judgment module configured to perform data processing at least based on the foreground object to judge whether the lighting device is in a normal state.

2. The monitoring system of claim 1, wherein the microcontroller further comprises:
    a foreground feature extraction module configured to extract a corresponding lighting state foreground feature from the foreground object;
    wherein the working condition judgment module judges, based on the lighting state foreground feature, whether the lighting device is in a normal state.

3. The monitoring system of claim 2, wherein the lighting state foreground feature extracted by the foreground feature extraction module comprises color and/or a light intensity of the lighting device, and/or a light intensity of a monitored area; and the working condition judgment module judges, based on the color and/or the light intensity of the lighting device and/or the light intensity of the monitored area, whether the lighting device is normal.

4. The monitoring system of claim 2, wherein the working condition judgment module is further configured to judge, based on the lighting state foreground feature of the foreground object, whether a specific lighting device is normal, and if the judgment result is "yes", indicate the judgment, based on the image data processed currently, on whether the lighting device is in a normal state or indicate the judgment result of whether the lighting device corresponding to the image data processed currently is in a normal state.

5. The monitoring system of claim 2, wherein the working condition judgment module is further configured to determine that the lighting device is in an abnormal state, when a judgment of at least two successive pieces of image data indicate that the lighting device is in an abnormal state.

6. The monitoring system of claim 2, wherein the imaging sensor senses at intervals of a predetermined time period to acquire image data of the lighting device in the predetermined time period, and provides the image data for the microcontroller for data processing.

7. The monitoring system of claim 2, wherein the background acquisition module is configured to acquire a first background model based on image data sensed when the lighting device is in a lighting state, or acquire a second background model based on image data sensed when the lighting device is in a non-lighting state, or acquire a third background model group based on image data sensed when the lighting device is in a lighting state with multiple specific light intensities.

8. The monitoring system of claim 2, wherein there are multiple imaging sensors, which are arranged along a length direction of the passenger conveyor.

9. The monitoring system of claim 2, wherein the monitoring system further comprises an alarm unit, and the working condition judgment module triggers the alarm unit to work when determining that the lighting device is abnormal.

10. The monitoring system of claim 2, wherein, the monitoring system further comprises a learning module, the learning module being configured to monitor a lighting state foreground feature of the lighting device of the passenger conveyor under a daily operation condition, to update the background model acquired by the background acquisition module.

11. The monitoring system of claim 1, wherein the imaging sensor is integrated in an RGB-D sensor, and the RGB-D sensor further comprises a depth sensing sensor.

12. The monitoring system of claim 1, wherein the microcontroller is further configured to trigger, when the working condition judgment module determines that the lighting device is in an abnormal state, outputting of a signal to the passenger conveyor and/or an elevator maintenance center of a building to prevent occurrence of a safety accident.

13. The monitoring system of claim 1, wherein the lighting device comprises one or any combination of a traffic flow lamp, a comb lamp, a step lamp, a handrail lamp, and a barrier lamp.

14. A monitoring method for a passenger conveyor, comprising:
    an image acquisition step: sensing a lighting device of the passenger conveyor to acquire image data;
    a background acquisition step: acquiring a background model based on image data sensed when the lighting device is in a normal state or in an abnormal state;
    a foreground detection step: comparing image data sensed in real time with the background model to obtain a foreground object; and
    a working condition judgment step: performing data processing at least based on the foreground object to judge whether the lighting device is in a normal state.

15. The monitoring method of claim 14, further comprising:
    a foreground feature extraction step: extracting a corresponding lighting state foreground feature from the foreground object according to the lighting device;
    wherein, in the working condition judgment step, whether the lighting device is in a normal state is judged based on the lighting state foreground feature.

16. The monitoring method of claim 15, wherein, the extracted lighting state foreground feature comprises color and/or a light intensity of the lighting device, and/or a light intensity of a monitored area; and in the working condition judgment step whether the lighting device is normal is judged based on the color and/or the light intensity of the lighting device and/or the light intensity of the monitored area.

17. The monitoring method of claim 16, wherein, in the working condition judgment step, when judging whether the lighting device is in a normal state is judging whether the lighting device emits light, whether the lighting device is in a normal state is judged based on the color and/or the light intensity of the lighting device.

18. The monitoring method of claim 16, wherein, in the working condition judgment step, when judging whether the lighting device is in a normal state is judging whether lighting brightness of the lighting device is suitable, whether the lighting device is in a normal state is judged based on the light intensity of the lighting device.

19. The monitoring method of claim 16, wherein, in the working condition judgment step, when judging whether the lighting device is in a normal state is judging whether lighting brightness of the lighting device is suitable, whether the lighting device is in a normal state is judged based on the light intensity and the color of the lighting device.

20. The monitoring method of claim 16, wherein, in the working condition judgment step, when judging whether the lighting device is in a normal state is judging whether lighting brightness of the lighting device is suitable, whether the lighting device is in a normal state is judged based on the light intensity of the monitored area.

21. The monitoring method of claim 16, wherein, in the foreground feature extraction step, the extracted lighting state foreground feature further comprises a position of the lighting device; and in the working condition judgment step, whether the lighting device is in a normal state is judged based on one or more of the color, the light intensity and the position of the lighting device and/or the light intensity of the monitored area.

22. The monitoring method of claim 15, wherein the working condition judgment step further comprises judging, based on the lighting state foreground feature of the foreground object, whether a specific lighting device is normal, and if the judgment result is "yes", indicating the judgment, based on the image data processed currently, on whether the lighting device is in a normal state or indicating the judgment result of whether the lighting device corresponding to the image data processed currently is in a normal state.

23. The monitoring method of claim 15, wherein the working condition judgment step further comprises determining, when a judgment result of at least two successive pieces of image data is that the lighting device is in a same abnormal state that the lighting device is in the abnormal state.

24. The monitoring method of claim 15, wherein the image acquisition step further comprises sensing at intervals of a predetermined time period to acquire image data of the lighting device in the predetermined time period, and providing the image data for the processing apparatus for data processing.

25. The monitoring method of claim 15, wherein the background acquisition step further comprises acquiring a first background model based on image data sensed when the lighting device is in a lighting state, or acquiring a second background model based on image data sensed when the lighting device is in a non-lighting state, or acquiring a third background model group based on image data sensed when the lighting device is in a lighting state with multiple specific light intensities.

26. The monitoring method of claim 15, further comprising an alarming step: triggering an alarm unit to work when it is determined based on the working condition judgment step that the lighting device is abnormal.

27. The monitoring method of claim 15, further comprising, a learning step: monitoring a lighting state foreground feature of the lighting device of the passenger conveyor under a daily operation condition, to update the background model acquired in the background acquisition step.

28. A passenger conveyor, comprising the monitoring system of claim 1.

29. A monitoring system of a passenger conveyor, comprising:
an imaging sensor configured to sense a lighting device of the passenger conveyor to acquire image data;
a microcontroller configured to process the image data to monitor whether the lighting device is in a normal state, the microcontroller is operable to:
acquiring a background model, using a background acquisition module, based on image data sensed when the lighting device is in a normal state or in an abnormal state;
compare the image data sensed in real time with the background model, via a foreground detection module, to obtain a foreground object; and
perform data processing at least based on the foreground object, using a working condition judgment module, to judge whether the lighting device is in a normal state.

* * * * *